United States Patent [19]

McGehee

[11] Patent Number: 4,974,125

[45] Date of Patent: Nov. 27, 1990

[54] VEHICULAR LIGHT BAR ARRANGEMENT

[76] Inventor: Michael G. McGehee, Rte. 2, Box 346-A Lake St., Greenfield, Mo. 65661

[21] Appl. No.: 486,357

[22] Filed: Feb. 28, 1990

[51] Int. Cl.$^5$ .............................................. B60Q 1/00
[52] U.S. Cl. .................................... 362/82; 362/83.2; 362/237
[58] Field of Search ................. 362/82, 83.2, 237, 238

[56] References Cited

U.S. PATENT DOCUMENTS

| | | | |
|---|---|---|---|
| 1,136,804 | 4/1915 | Horning et al. | 362/83.2 |
| 1,337,872 | 4/1920 | Zahnow | 362/82 |
| 1,564,614 | 12/1925 | Ogram | 362/82 |
| 1,572,024 | 2/1926 | MacInnes | 362/82 |
| 2,131,962 | 10/1938 | McAlpin | 362/83.2 |
| 3,639,748 | 2/1972 | Pearson et al. | 362/82 |
| 4,420,797 | 12/1983 | Tohata | 362/82 |

FOREIGN PATENT DOCUMENTS 2302316 7/1974 Fed. Rep. of Germany ........ 362/82

*Primary Examiner*—Carroll B. Dority
*Attorney, Agent, or Firm*—Leon Gilden

[57] ABSTRACT

An apparatus including a support bar containing a series of aligned, illuminated geometric configurations to enhance visibility of a vehicle mounting the organization. Spaced flanges are mounted underlying the main support bar for securement of mud flaps thereto. A separate license plate flange is securable to a medial bottom surface of the support bar. Access plates are mounted to a rear surface of the bar for service of lights and the like contained within the bar.

4 Claims, 4 Drawing Sheets

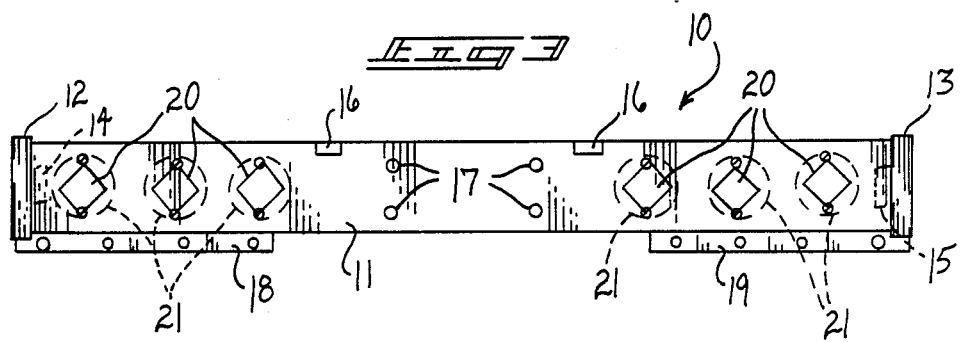
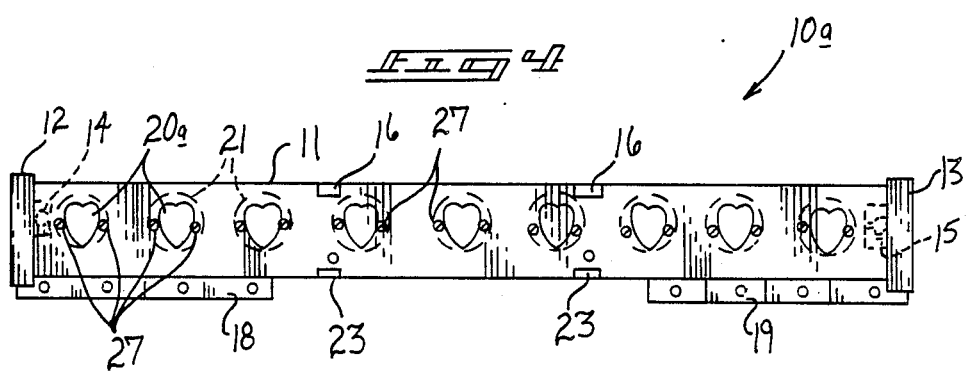
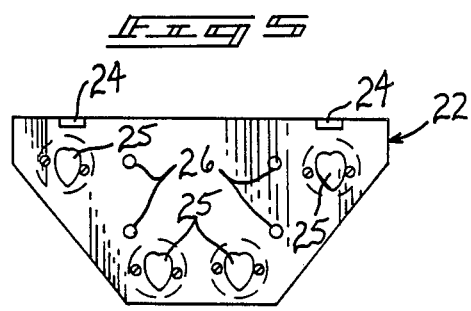

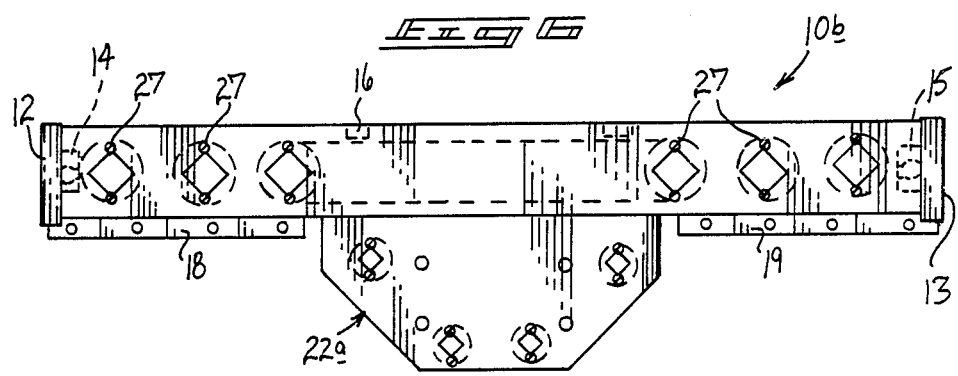
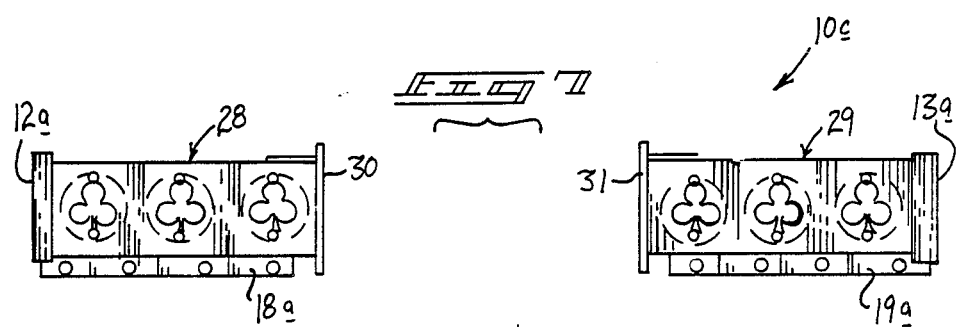
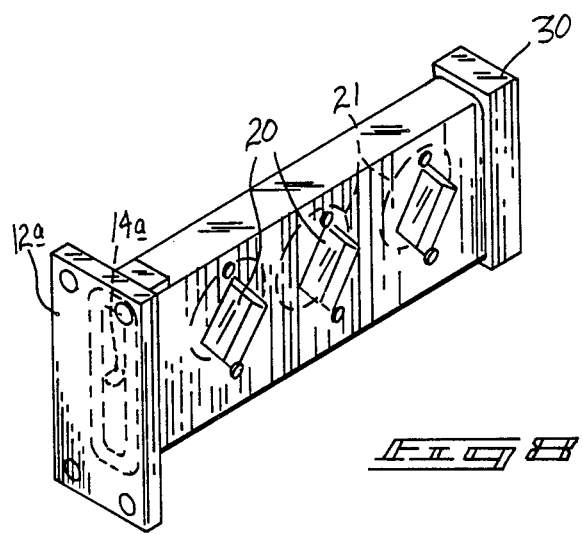

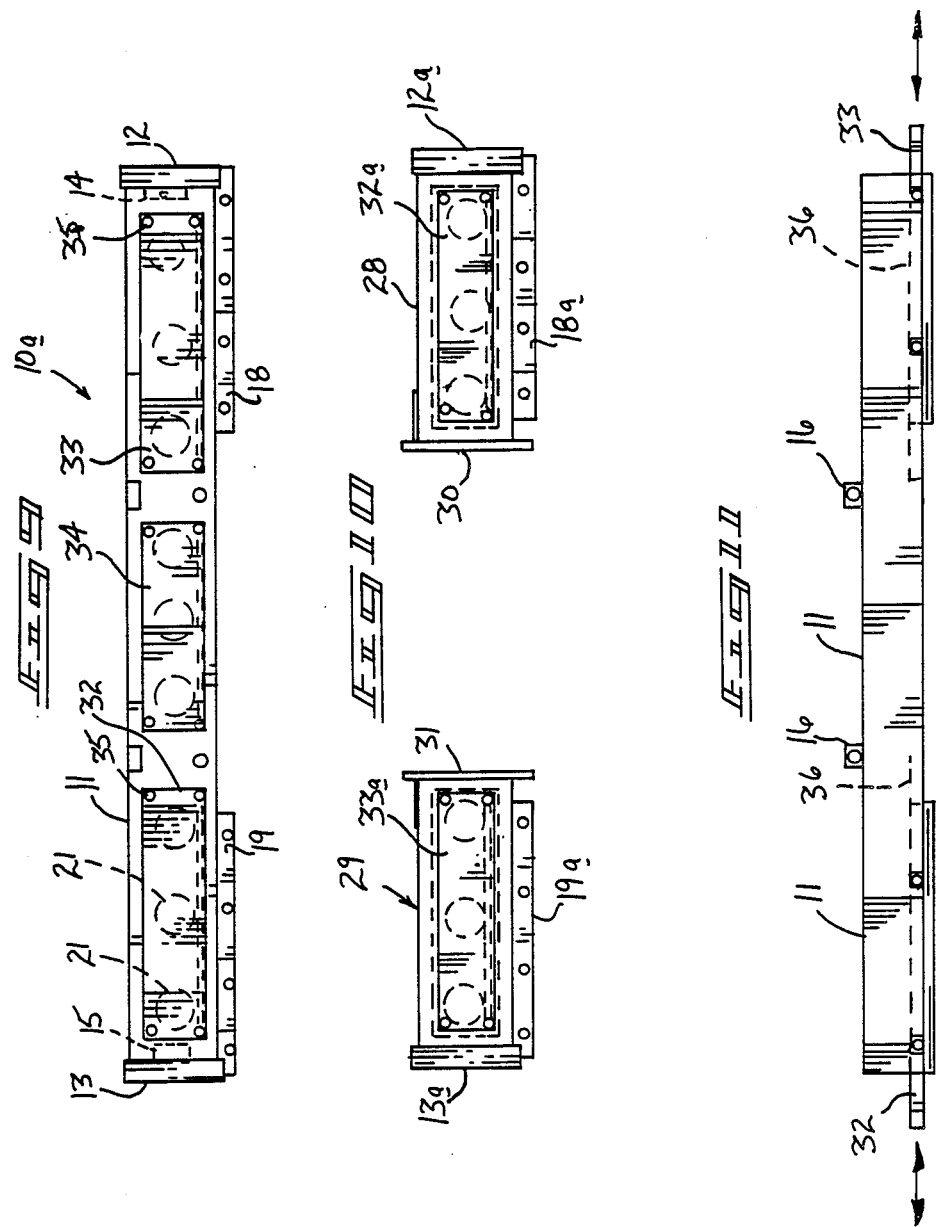

VEHICULAR LIGHT BAR ARRANGEMENT

BACKGROUND OF THE INVENTION

1. Field of the Invention

The field of invention relates to light bar arrangements, and more particularly pertains to a new and improved vehicular light bar arrangement wherein the same is mounted in lieu of a bumper member to a vehicle to enhance illumination and visibility, as well as illuminating the geometric proportions of the associated vehicle.

2. Description of the Prior Art

Vehicular transportation, and particularly trucks, require enhanced visibility during their operation during periods of limited available light, such as during evening hours. Prior art bumper members for mounting to vehicles fail to provide the complete and readily serviceable organization as set forth by the instant invention. Particularly the instant invention enhances the visible observation of geometric proportions of an associated vehicle, as well as attracting attention to the bumper arrangement by the orientation and configuration of the lights directed therethrough. Examples of the prior include U.S. Pat. No. 4,692,845 to Widhalm, et al., wherein a truck bed includes a roll bar with a light pair mounted thereon. The light pair are pivotally mounted in brackets to enable forward and rear selective illumination relative to the roll bar and associated truck.

U.S. Pat. No. 4,758,931 to Gabaldon illustrates a perimeter of lights mounted about a rear window of a motor vehicle wherein the lights are consistent with government standards associated with turn and stop signals and the like.

U.S. Pat. No. 4,707,767 to Bergin, et al., illustrates a motor vehicle headlight module wherein a series of staggered light members (i.e. floor members) are positioned within a housing for use such as with turn signals and the like in vehicles.

U.S. Pat. No. 4,819,132 to Hwan, et al., illustrates the use of a "third brake light" for mounting at an elevated position interiorly of an automobile to illuminate a stop signal associated with the automobile.

U.S. Pat. No. 4,751,493 to Miller illustrates a kit for retrofit to an associated vehicle for use as a warning, or brake light, for mounting in such vehicles.

As such, it may be appreciated that there continues to be a need for a new and improved vehicular light bar arrangement wherein the same addresses both the problems of ease of use, as well as effectiveness in construction and in this respect, the present invention substantially fulfills this need.

SUMMARY OF THE INVENTION

In view of the foregoing disadvantages inherent in the known types of vehicular light arrangements now present in the prior art, the present invention provides a vehicular light bar arrangement wherein the same is positioned in a transverse manner to a forward or rearward end of a vehicle for enhanced illumination and visibility of the associated vehicle. As such, the general purpose of the present invention, which will be described subsequently in greater detail, is to provide a new and improved vehicular light bar arrangement which has all the advantages of the prior art vehicular light apparatus and none of the disadvantages.

To attain this, the present invention includes a support bar containing a series of aligned, illuminated geometric configurations to enhance visibility of a vehicle mounting the organization. Spaced flanges are mounted underlying the main support bar for securement of mud flaps thereto. A separate license plate flange is securable to a medial bottom surface of the support bar. Access plates are mounted to a rear surface of the bar for service of lights and the like contained within the bar.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved vehicular light bar arrangement which has all the advantages of the prior art vehicular light apparatus and none of the disadvantages.

It is another object of the present invention to provide a new and improved vehicular light bar arrangement which may be easily and efficiently manufactured and marketed.

It is a further object of the present invention to provide a new and improved vehicular light bar arrangement which is of a durable and reliable construction.

An even further object of the present invention is to provide a new and improved vehicular light bar arrangement which is susceptible of a low cost of manufacture with regard to both materials and labor, and which accordingly is then susceptible of low prices of sale to the consuming public, thereby making such vehicular light bar arrangements economically available to the buying public.

Still yet another object of the present invention is to provide a new and improved vehicular light bar arrangement which provides in the apparatuses and methods of the prior art some of the advantages thereof, while simultaneously overcoming some of the disadvantages normally associated therewith.

Still another object of the present invention is to provide a new and improved vehicular light bar arrangement to provide enhanced visibility of an associated vehicle.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and object other than those set forth above will become apparent when consideration is given to the following detailed description thereof. Such description makes reference to the annexed drawings wherein:

FIG. 3 is an orthographic frontal view of the instant invention taken in elevation.

FIG. 4 is an orthographic frontal view taken in elevation of a modification of the instant invention.

FIG. 5 is an orthographic frontal view taken in elevation of a license plate flange utilized by the instant invention.

FIG. 6 is an orthographic view taken in elevation of the license plate flange mounted to the light bar arrangement.

FIG. 7 is a orthographic frontal view taken in elevation of a split light bar arrangement.

FIG. 8 is an isometric illustration of a single split light bar arrangement, as illustrated in FIG. 7.

FIG. 9 is an orthographic rear view taken in elevation of the light bar assembly, as illustrated in FIG. 4.

FIG. 10 is an orthographic frontal view taken in elevation of the first and second split light bar members.

FIG. 11 is a top orthographic view of the light bar assembly of FIG. 9.

DESCRIPTION OF THE PREFERRED EMBODIMENT

Figure 1:
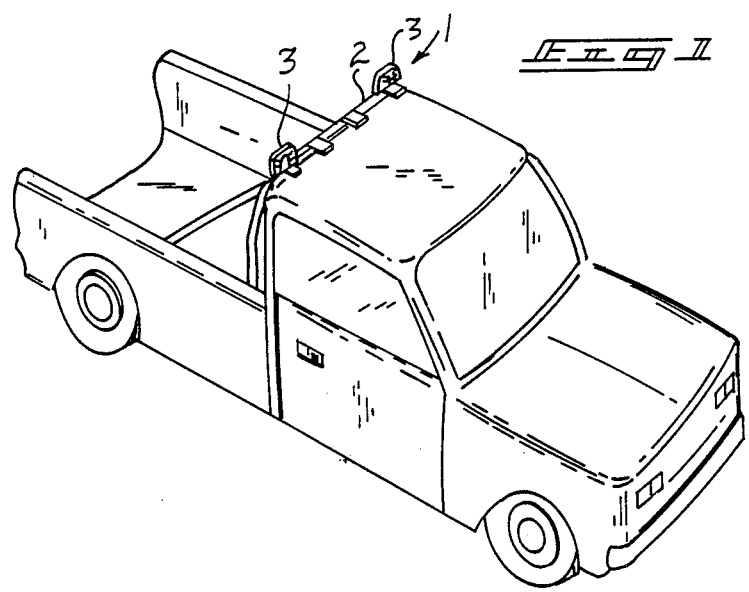
FIG. 1 is an isometric illustration of a prior art vehicular light bar assembly.

With reference now to the drawings, and in particular to FIGS. 1 to 11 thereof, a new and improved vehicular light bar arrangement embodying the principles and concepts of the present invention and generally designated by the reference numerals 10, 10a, 10b, and 10c will be described.

FIG. 1 illustrates a prior art light bar arrangement 1 wherein a plurality of lights 3 are mounted to an upper horizontal roll bar portion 2, wherein the lights 3 are pivotally mounted about brackets to enable rearward and forward selective orientation of the lights.

Figure 2:
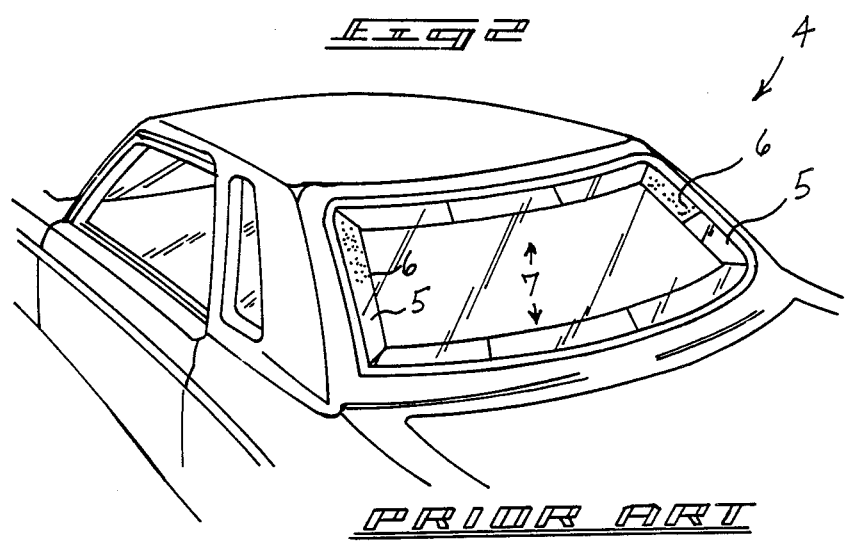
FIG. 2 is an isometric illustration of a further light arrangement for a vehicular organization.

FIG. 2 illustrates a further light bar assembly 4, wherein a series of perimeter lights 5 and 6 spaced at side portions of the perimeter with upper and lower end lights 7 providing all necessary signalling required by government standards.

More specifically, the vehicular light bar arrangement 10 of the instant invention essentially comprises an elongate, generally "C" shaped support beam 11, including a left transparent plate 12 and a right transparent plate 13 mounted to respective terminal ends of the support beam, wherein the plates 11 and 12 are orthogonally aligned relative to the longitudinal axis of the support beam. A respective left and right lamp housing 14 and 15 for electrical communication with the turn signal wiring of an associated vehicle are mounted adjacent to and interiorly of the plates 12 and 13 respectively. A pair of upper beam mounting flanges 16, including apertures therethrough (see FIG. 11) are integrally secured and extending rearwardly of an upper flange of the "C" shaped support beam 11 and arranged for securement to a frame structure of an associated vehicle, such as a truck. The license plate apertures 17 are formed through a forward face of the support beam for securement of a license plate thereto. A lower left and respective right mounting flange 18 and 19 are integrally secured to and arranged generally parallel to the forward face of the beam 11, wherein each of the mounting flanges 18 and 19 include a series of apertures therethrough for securement of a mud flap pair thereto.

Mounted through the forward face of the support beam 11 are a series of right and left aligned translucent lenses 20 of a recognizable and attractive geometric configuration to include diamonds, clubs, hearts, and spades. These configurations attract attention to the bumper organization to enhance its safety through visibility. Light member housings 21 are secured coaxially and rearwardly of each of the translucent lenses 20 for securement of conventional illumination bulbs for electrical communication in a conventional manner with the lighting circuit of a vehicular organization.

A license plate flange 22 includes a further series of translucent lenses 25 and associated light member housings 21 adjacent side and lower peripheral edges of the license plate flange. A plurality of spaced license plate securement flanges 23 are mounted on the support beam for association with license plate flange mounting members integrally and orthogonally formed to an upper edge of the license plate flange 22. The securement flanges 23 and the mounting members 24 are spaced apart in equal predetermined spacing. License plate mounting apertures 26 are accordingly formed through the flange 22 for securement of a license plate thereon. It is understood in utilization of the license plate flange, a continuous series of aligned translucent lenses and associated housings 20a and 21 are formed coextensively through the forward face of the support beam 11. The modified light bar 10a provides enhanced visibility over the embodiment, as illustrated in FIG. 3. FIG. 6 illustrates the use of a diamond-shaped pattern, with the lenses 20a directed coextensively throughout the face of the support beam. It is understood that such lights need not extend completely across, but it would of course provide diminished visibility.

FIG. 7 illustrates a modified light bar arrangement 10c for utilization with vehicles requiring a plurality of spaced half bumpers. The half bumpers would include a first half bumper 28 and a second half bumper 29 cooperative together in utilizing a left and right transparent plate 12a and 13a respectively. A left and right block plate 30 and 31 would seal the interior ends of the associated half bumpers. The half bumpers further include an elongate left and right mounting flange 18a and 19a for securement of a mud flap arrangement thereto.

FIG. 9 illustrates a rear view of the support beam 11 utilizing a right access plate 32, a left access plate 33, and a medial access plate 34 mounted through the rear face of the beam 11 to overlie and protect the translucent lenses 20 and the associated housings 21. Fasteners 35 mount the access plates to the rear face of the beam 11. Similarly, the half bumpers 28 and 29 would include a single right and left access plate 32a and 33a, as illustrated in FIG. 10.

FIG. 11 illustrates the use of the left and right access plates 32 and 33 mounted within the slide tracks 36 to slidably secure the access plates thereto, whereupon removal of the left and right transparent plates 12 and 13, the access plates 32 and 33 may be slid exteriorly of the support beam 11 when the fasteners 35 are accordingly removed.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is:

1. A vehicular light bar for use in a vehicular bumper comprising,
    an elongate, longitudinally aligned support beam including a forward face and a rear face defined by a left end portion and a right end portion, and
    a series of translucent geometrically equal lenses mounted through the forward face of the support beam aligned relative to one another, and
    each lens including a housing means coaxially aligned with each lens for mounting an illumination bulb within each housing means, and
    wherein each left and right end includes a transparent respective left and right plate mounted overlying each respective left and right end portion, wherein each left and right transparent plate includes an illumination member mounted within the respective left and right end portion for electrical association with a turn signal circuit of an associated vehicle, and
    further including a respective left and right mounting flange positioned integrally to a lowermost respective left and right lower edge of the support beam extending interiorly of the support beam from each respective left and right end portion, each respective left and right mounting flange including a series of apertures therethrough for permitting securement of a vehicular mud flap to each mounting flange, and
    wherein the translucent lenses are coextensively formed and mounted throughout the forward face of the support beam at spaced equal intervals relative to one another, and
    further including a license plate flange, the license plate flange including a further series of translucent geometrically equal lenses positioned adjacent lower and side edges of the license plate flange, the license plate flange including a top edge, with the top edge including mounting members, the mounting members securable to the forward face of the support beam between the left and right mounting flanges.

2. An apparatus as set forth in claim 1 wherein each of the translucent lenses mounted within the license plate flange include an associated housing means for mounting an illumination bulb therewith, the illumination bulbs of the license plate flange of the support beam mounted for simultaneous illumination for enhanced visibility of the light bar.

3. An apparatus as set forth in claim 2 including a right access plate, a left access plate, and a medial access plate mounted through the rear face of the support beam, the access plates including fasteners to selectively secure the access plates relative to the rear face of the support beam.

4. An apparatus as set forth in claim 3 wherein the left and right access plates are slidably mounted within slide tracks to enable slidable removal of the left and right access plates upon removal of the fasteners.

* * * * *